(12) United States Patent
Sakamoto et al.

(10) Patent No.: US 10,053,136 B2
(45) Date of Patent: Aug. 21, 2018

(54) ROTATION-LINEAR MOTION CONVERSION APPARATUS AND STEERING APPARATUS

(71) Applicant: THK CO., LTD., Tokyo (JP)

(72) Inventors: Toshihisa Sakamoto, Tokyo (JP); Kazuhiko Akiyama, Tokyo (JP); Toshiro Minami, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/523,766

(22) PCT Filed: Nov. 19, 2015

(86) PCT No.: PCT/JP2015/082516
§ 371 (c)(1),
(2) Date: May 2, 2017

(87) PCT Pub. No.: WO2016/080480
PCT Pub. Date: May 26, 2016

(65) Prior Publication Data
US 2017/0320514 A1  Nov. 9, 2017

(30) Foreign Application Priority Data

Nov. 21, 2014 (JP) ................................. 2014-236926

(51) Int. Cl.
*B62D 3/12* (2006.01)
*F16H 19/04* (2006.01)

(52) U.S. Cl.
CPC ............. *B62D 3/123* (2013.01); *B62D 3/126* (2013.01); *F16H 19/04* (2013.01)

(58) Field of Classification Search
CPC .......... B62D 3/123; B62D 3/126; F16H 19/04
See application file for complete search history.

(56) References Cited

U.S. PATENT DOCUMENTS 3,897,982 A * 8/1975 Teramachi ............... B23Q 1/40
384/45
4,764,032 A   8/1988 Tanaka
(Continued)

FOREIGN PATENT DOCUMENTS

CN    102858617 A    1/2013
CN    203651878 U    6/2014
(Continued)

OTHER PUBLICATIONS

International Search Report dated Feb. 16, 2016, issued in counterpart International Application No. PCT/JP2015/082516 (2 pages).

(Continued)

*Primary Examiner* — Faye M Fleming
(74) *Attorney, Agent, or Firm* — Westerman, Hattori, Daniels & Adrian, LLP

(57) ABSTRACT

A rotation-linear motion conversion apparatus (10) includes: a rack bar (30) in which a rack gear (32) is formed; a housing (40) that surrounds the rack bar (30); a pinion shaft (20) including a pinion gear (22) that engages with the rack gear (32) and that is inserted inside the housing (40); and a support part (50) that is provided on an opposed surface (41*s*1), which is opposed to the rack gear (32), of the housing (40) and that supports the rack bar (30) movably in a longitudinal direction of the rack bar (30).

16 Claims, 13 Drawing Sheets

(56) References Cited

U.S. PATENT DOCUMENTS

| | | | |
|---|---|---|---|
| 6,427,552 B1 | 8/2002 | Sahr | |
| 9,975,574 B2 * | 5/2018 | Ohashi | B62D 7/228 |
| 2015/0274191 A1 * | 10/2015 | Vogler | B62D 3/12 |
| | | | 280/93.51 |
| 2016/0167697 A1 * | 6/2016 | Minami | B62D 3/12 |
| | | | 74/89.23 |

FOREIGN PATENT DOCUMENTS

| | | |
|---|---|---|
| FR | 2924083 A1 | 5/2009 |
| JP | 63-140111 A | 6/1988 |
| JP | 3074339 B2 | 8/2000 |
| JP | 2002-274396 A | 9/2002 |
| JP | 2012-144132 A | 8/2012 |
| WO | 02/49904 A1 | 6/2002 |

OTHER PUBLICATIONS

Office Action dated Feb. 16, 2018, issued in counterpart German Application No. 11 2015 005 261.5, with English translation (10 pages).

Office Action dated Oct. 10, 2017, issued in counterpart Chinese Application No. 201580061376.6, with partial English translation. (7 pages).

* cited by examiner

ROTATION-LINEAR MOTION CONVERSION APPARATUS AND STEERING APPARATUS

TECHNICAL FIELD

The present invention relates to a rotation-linear motion conversion apparatus and a steering apparatus.

Priority is claimed on Japanese Patent Application No. 2014-236926, filed on Nov. 21, 2014, the contents of which are incorporated herein by reference.

BACKGROUND

Rotation-linear motion conversion apparatuses are used in steering apparatuses that arbitrarily change the travel direction of a vehicle.

A rotation-linear motion conversion apparatus includes a pinion shaft in which a pinion gear is formed and a rack bar in which a rack gear that engages with the pinion gear is formed. A rack and pinion apparatus converts a rotation motion of the pinion shaft into a linear motion of the rack bar by the action between the pinion gear and the rack gear.

When a steering wheel is rotated, the pinion shaft is rotated via a steering shaft. In accordance with the rotation of the pinion shaft, the rack bar is reciprocated in the vehicle width direction and changes the direction (travel direction) of a tire (wheel) via a link member.

RELATED ART DOCUMENTS

Patent Documents

[Patent Document 1] Japanese Patent No. 3074339

SUMMARY OF INVENTION

Problem to be Solved by the Invention

As described in Patent Document 1, a housing surrounds the rack bar, and a support part that supports the rack bar movably in a longitudinal direction of the rack bar is provided on the housing. In the configuration of Patent Document 1, the pinion shaft is inserted inside the housing, and the rack gear of the rack bar engages with the pinion gear of the pinion shaft.

However, the housing is thermally expanded due to engine heat in an engine room, exhaust pipe heat, external ambient heat, or the like. When the housing is expanded, the rack bar and the pinion shaft are displaced in a direction in which the rack bar and the pinion shaft are separated from each other, and a preload amount between the rack gear and the pinion gear becomes small. The reduction of the preload amount between the rack gear and the pinion gear becomes a reason for causing abnormal noise between gears or a dead zone at the time of steering.

An object of an aspect of the present invention is to provide a rotation-linear motion conversion apparatus and a steering apparatus capable of preventing reduction of a preload amount between a rack gear and a pinion gear due to thermal expansion of a housing.

Means for Solving the Problem

A rotation-linear motion conversion apparatus according to an aspect of the present invention includes: a rack bar in which a rack gear is formed; a housing that surrounds the rack bar; a pinion shaft including a pinion gear that engages with the rack gear and that is inserted inside the housing; and a support part that is provided on an opposed surface, which is opposed to the rack gear, of the housing and that supports the rack bar movably in a longitudinal direction of the rack bar.

A steering apparatus according to an aspect of the present invention includes: a steering shaft that is connected to a steering wheel; a link member that is connected to a wheel; and the above-described rotation-linear motion conversion apparatus that converts a rotation of the steering shaft into a linear motion and that linearly moves the link member.

Advantage of the Invention

According to an aspect of the present invention, it is possible to obtain a rotation-linear motion conversion apparatus and a steering apparatus capable of preventing reduction of a preload amount between a rack gear and a pinion gear due to thermal expansion of a housing.

DESCRIPTION OF THE EMBODIMENTS

Hereinafter, an embodiment of the present invention will be described with reference to the drawings.

Figure 1:
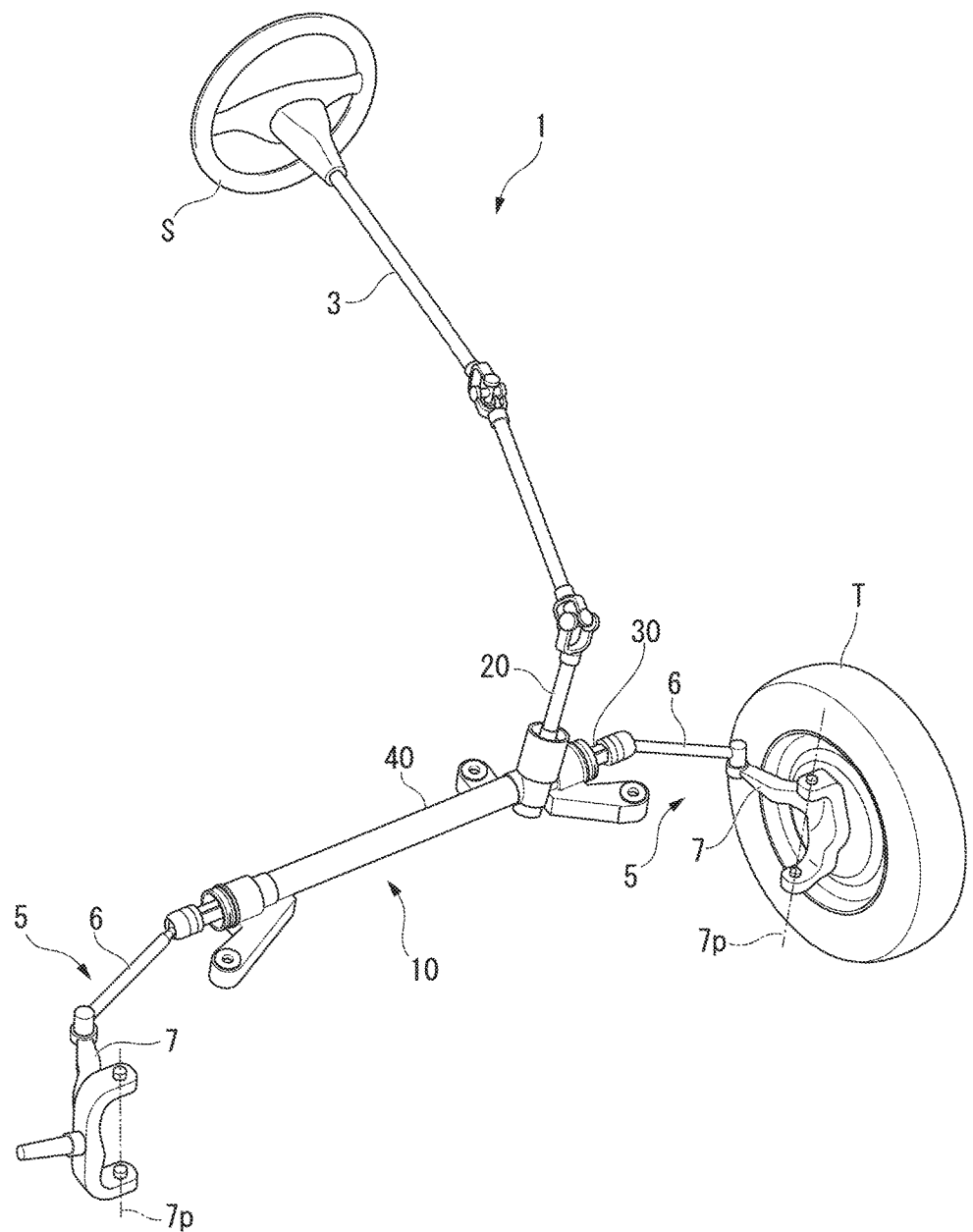
FIG. 1 is a perspective view showing a steering apparatus according to an embodiment of the present invention.

FIG. 1 is a perspective view showing a steering apparatus 1 according to an embodiment of the present invention.

The steering apparatus 1 is an apparatus that arbitrarily changes the travel direction of a vehicle. The steering apparatus 1 is connected to a pair of tires T (wheels) as front wheels.

The steering apparatus 1 has a steering shaft 3, a link member 5, and a rack and pinion apparatus 10 (rotation-linear motion conversion apparatus).

The steering shaft 3 is a member that is also called as a steering column. A steering wheel S is connected to an upper end of the steering shaft 3. A lower end of the steering shaft 3 is connected to a pinion shaft 20 of the rack and pinion apparatus 10.

The link member 5 has a tie rod 6 and a knuckle arm 7. An inner end of the tie rod 6 is connected to a rack bar 30 of the rack and pinion apparatus 10. An outer end of the tie rod 6 is connected swingably to an inner end of the knuckle arm 7. An outer end of the knuckle arm 7 is connected to the tire T.

The rack and pinion apparatus 10 is an apparatus that converts a rotation motion of the steering shaft 3 into a linear motion and reciprocates the link member 5 (tie rod 6). When the tie rod 6 is reciprocated, the knuckle arm 7 swings around a vertical axis 7p. Thereby, the direction (travel direction) of the tire T connected to the knuckle arm 7 is changed.

Next, a configuration of the rack and pinion apparatus 10 is described.

Figure 2:
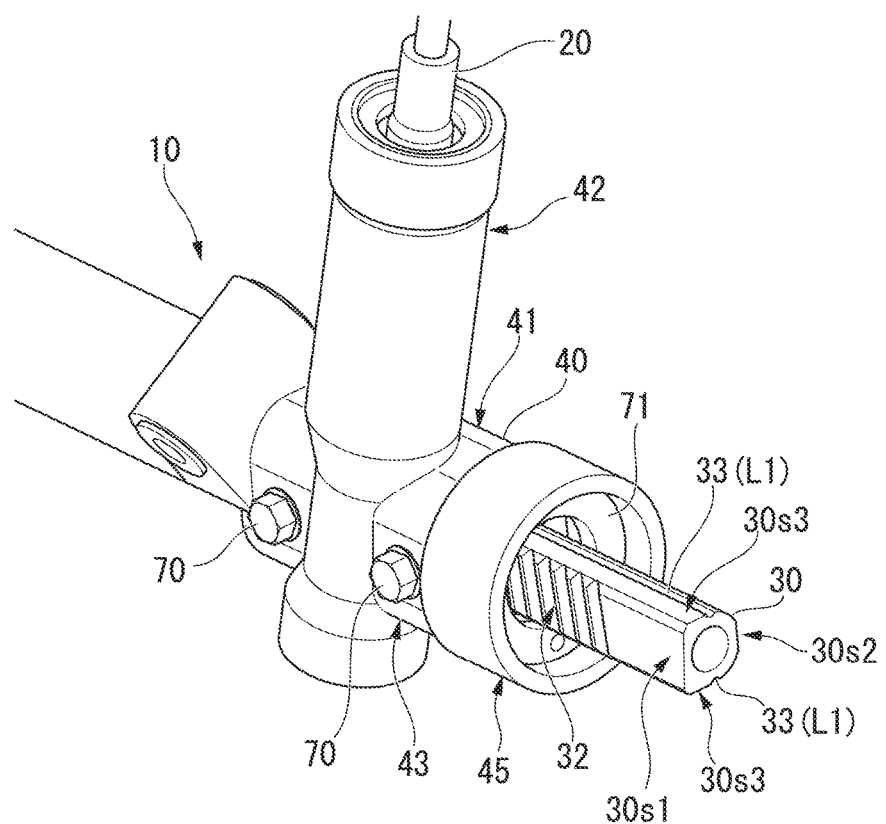
FIG. 2 is a perspective view showing a rack and pinion apparatus according to the embodiment of the present invention.
Figure 3:
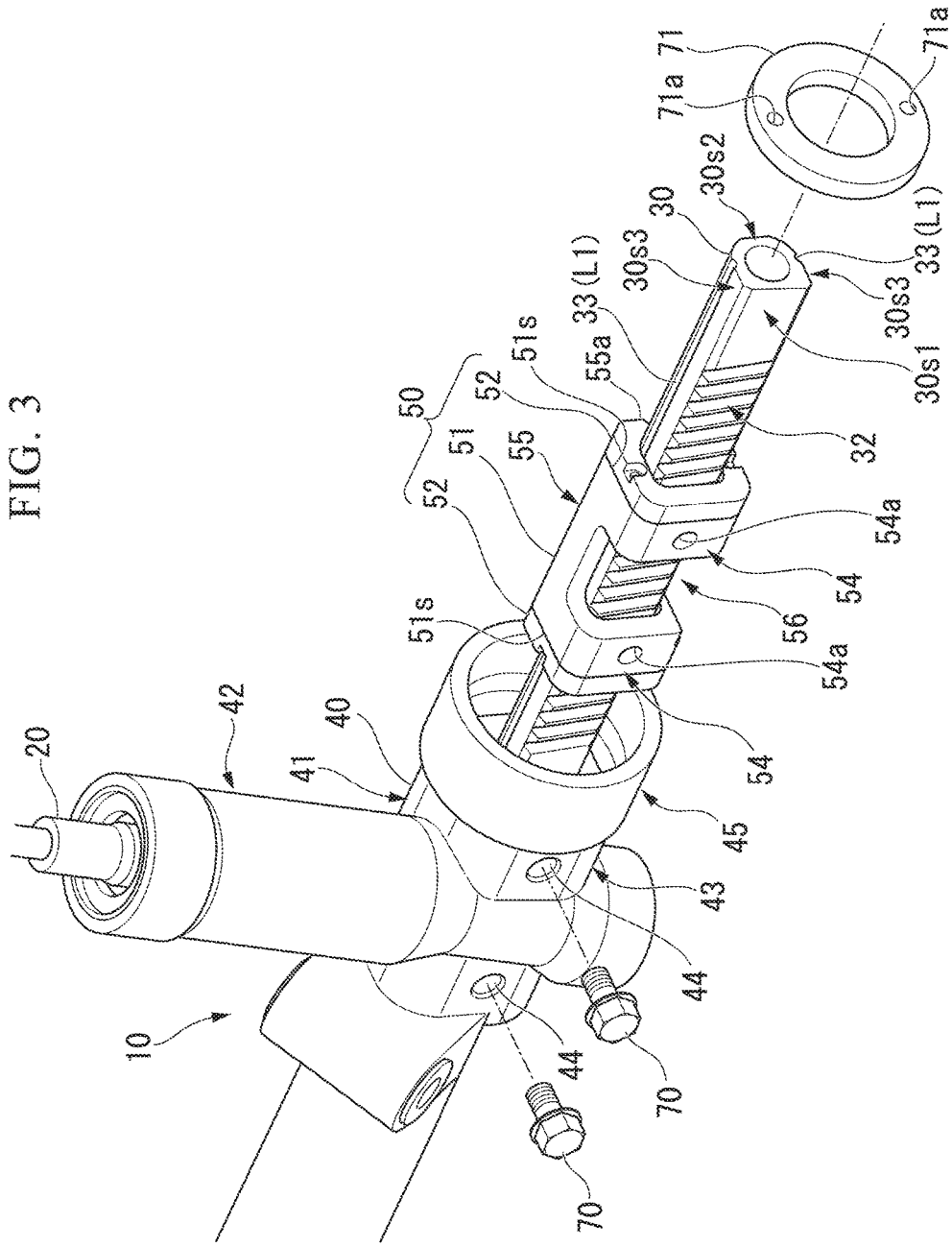
FIG. 3 is an exploded perspective view showing the rack and pinion apparatus according to the embodiment of the present invention.
Figure 4:
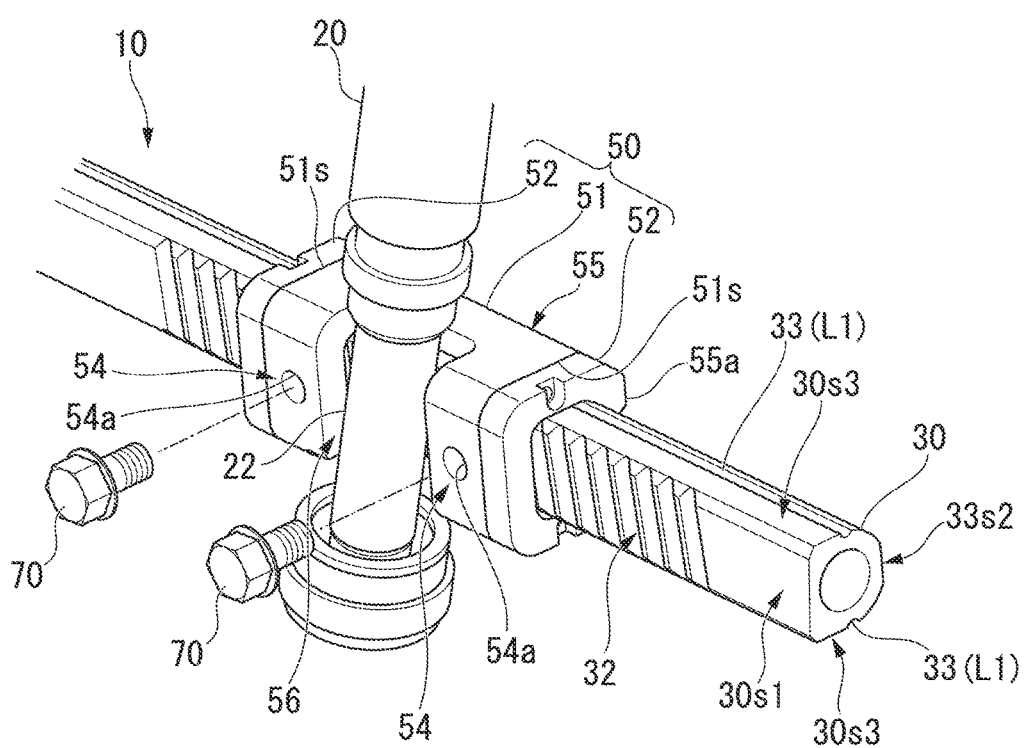
FIG. 4 is a perspective view showing an engagement state between a pinion shaft and a rack bar according to the embodiment of the present invention.

FIG. 2 is a perspective view showing the rack and pinion apparatus 10 according to the embodiment of the present invention. FIG. 3 is an exploded perspective view showing the rack and pinion apparatus 10 according to the embodiment of the present invention. FIG. 4 is a perspective view showing an engagement state between the pinion shaft 20 and the rack bar 30 according to the embodiment of the present invention.

As shown in FIG. 3, the rack and pinion apparatus 10 has the pinion shaft 20, the rack bar 30, a housing 40, and a support block 50 (support part).

The pinion shaft 20 and the rack bar 30 form a rack and pinion mechanism (rotation-linear motion conversion mechanism). The rack bar 30 and the support block 50 form a linear guide mechanism (linear motion guide mechanism).

The pinion shaft 20 is a shaft member having a substantially columnar shape. A first end part of the pinion shaft 20 is connected to the steering shaft 3 (refer to FIG. 1). As shown in FIG. 4, a pinion gear 22 is formed on a second end part of the pinion shaft 20. The pinion gear 22 engages with a rack gear 32 of the rack bar 30. The pinion gear 22 has a spur tooth, a helical tooth, or the like (not shown). The number of teeth, size, or accuracy the pinion gear 22 can be arbitrarily set.

The rack bar 30 is a rod member having a substantially square pillar shape. The rack gear 32 is formed on one surface (hereinafter, referred to as a front surface 30s1 of the rack bar 30) of outer circumferential surfaces of the rack bar 30. The rack gear 32 engages with the pinion gear 22 of the pinion shaft 20.

The number of teeth, size, or accuracy of the rack gear 32 can be arbitrarily set on the condition that the rack gear 32 can engage with the pinion gear 22.

As shown in FIG. 3, the housing 40 is a tube member having a substantially cylindrical shape. The housing 40 surrounds the rack bar 30. The housing 40 has a main body part 41 having a tubular shape and that is opposed to an outer circumference of the rack bar 30 and a shaft insertion part 42 having a tubular shape and through which the pinion shaft 20 is inserted inside the main body part 41. The shaft insertion part 42 is provided to cross diagonally with respect to the main body part 41. The inside of the shaft insertion part 42 is in communication with the inside of the main body part 41. The shaft insertion part 42 accommodates a plurality of bearings 42a (refer to FIG. 5 described below) that rotatably support the pinion shaft 20.

Figure 6:
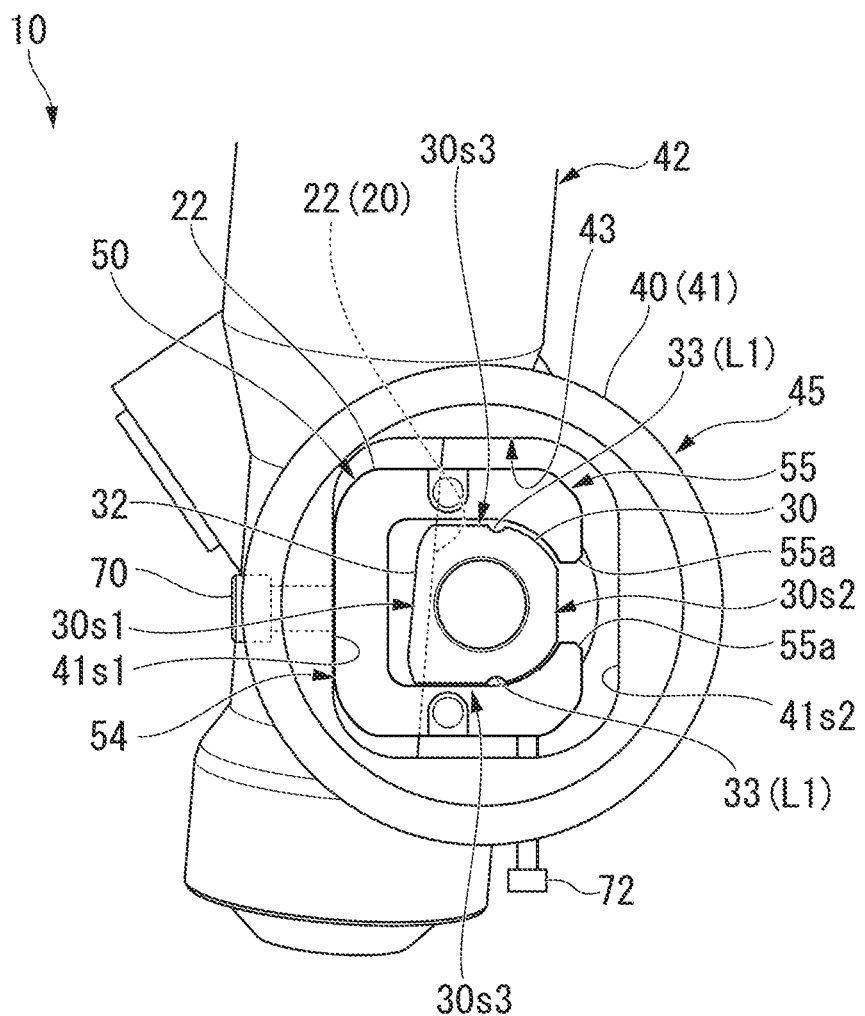
FIG. 6 is a side view showing the rack and pinion apparatus according to the embodiment of the present invention.

As shown in FIG. 3, the main body part 41 has a block accommodation part 43 that accommodates the support block 50 together with the rack bar 30. The block accommodation part 43 is provided at a part at which the shaft insertion part 42 crosses with respect to the main body part 41. The block accommodation part 43 has a wall surface having a substantially rectangular shape in side view as shown in FIG. 6 described below. With reference back to FIG. 3, a hole part 44 in which a bolt 70 that fixes the support block 50 is inserted is formed on the block accommodation part 43. The main body part 41 has a cover accommodation part 45 provided adjacent to the block accommodation part 43. The cover accommodation part 45 accommodates a cover member 71 by which the block accommodation part 43 that accommodates the support block 50 is capped.

The cover member 71 is a plate member having an annular shape. The inner diameter of the cover member 71 is set to a size such that the rack bar 30 can pass through the cover member 71 and the support block 50 cannot pass through the cover member 71. A hole part 71a is formed on the cover member 71. The cover member 71 is fixed to the cover accommodation part 45 by a bolt (not shown) inserted in the hole part 71a. The hole part 71a is arranged at an outer position than the support block 50. The hole part 71a has a configuration in which the bolt (not shown) inserted in the hole part 71a is screwed to the cover accommodation part 45 from a longitudinal direction of the rack bar 30.

The support block 50 supports the rack bar 30 movably in the longitudinal direction. A rolling element rolling surface 33 is formed on a side surface 30s3 of the rack bar 30 along the longitudinal direction. The support block 50 supports the rack bar 30 movably in the longitudinal direction via a ball (rolling element) (not shown) that rolls on the rolling element rolling surface 33. The support block 50 has a block main body 51 and an end plate 52 attached to an end surface 51s of the block main body 51.

Next, a configuration of the support block 50 is described.

Figure 5:
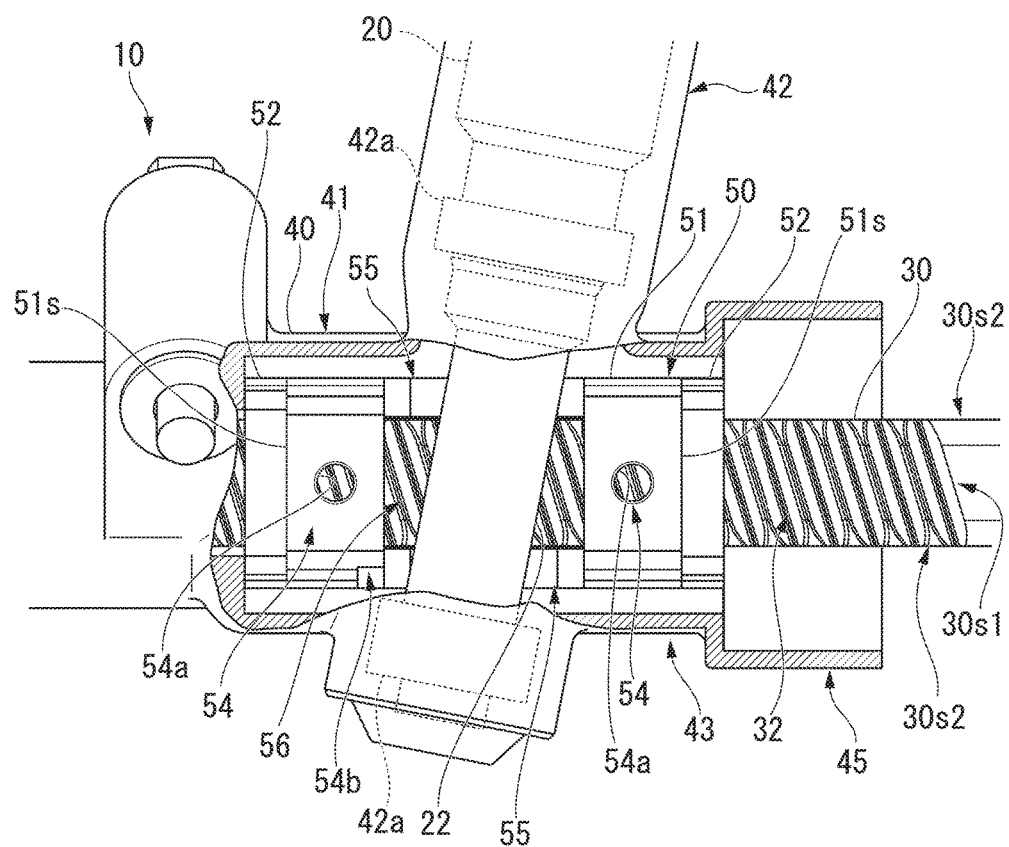
FIG. 5 is an exploded cross-sectional view showing the rack and pinion apparatus according to the embodiment of the present invention.

FIG. 5 is an exploded cross-sectional view showing the rack and pinion apparatus 10 according to the embodiment of the present invention. FIG. 6 is a side view showing the rack and pinion apparatus 10 according to the embodiment of the present invention. In FIG. 5 and FIG. 6, for ease of understanding, the cover member 71 is not shown.

Figure 7A:
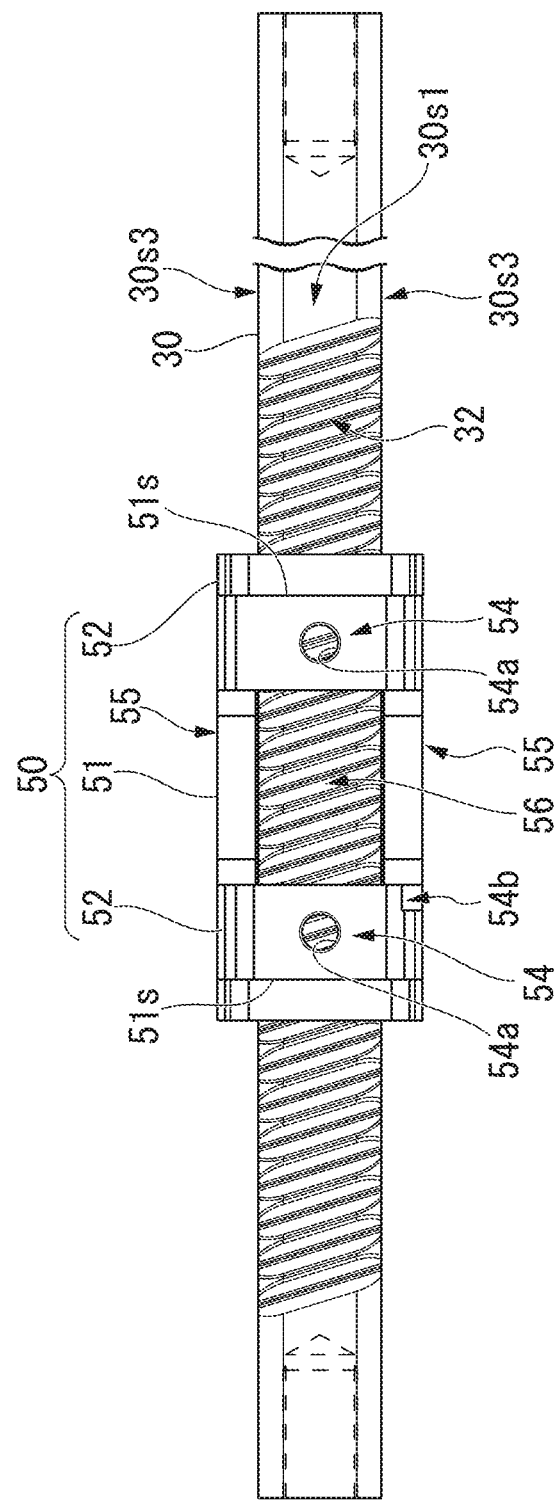
FIG. 7A is a front view showing an engagement state between a support block and a rack bar according to the embodiment of the present invention.
Figure 7B:
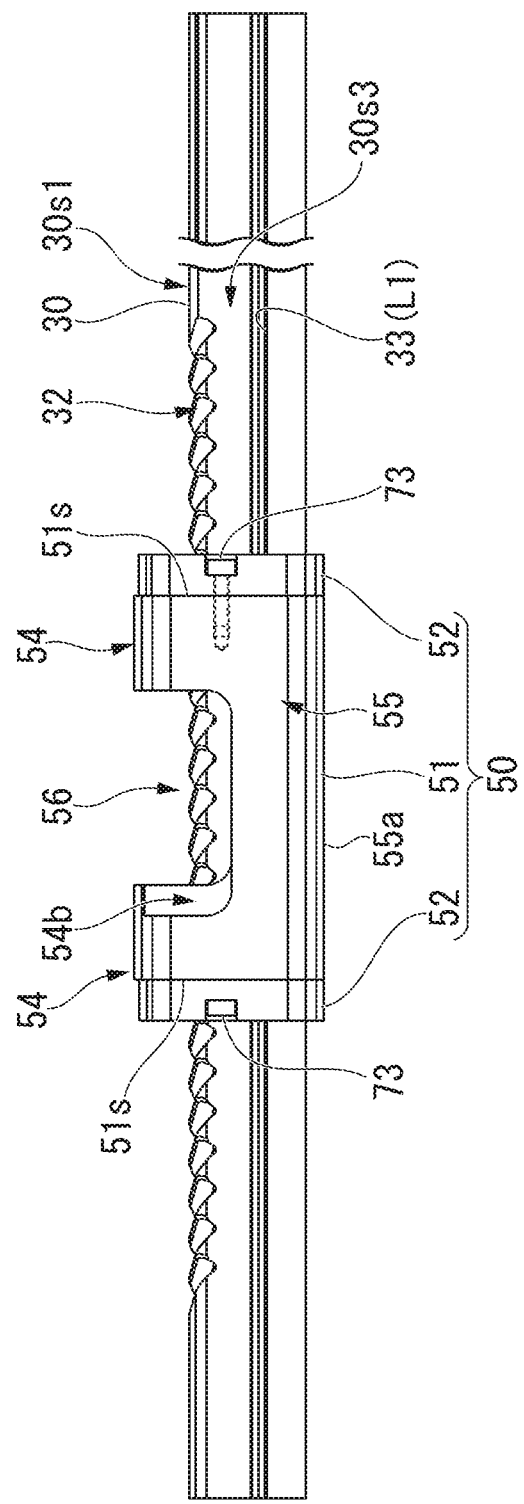
FIG. 7B is a bottom view showing the engagement state between the support block and the rack bar according to the embodiment of the present invention.
Figure 8:
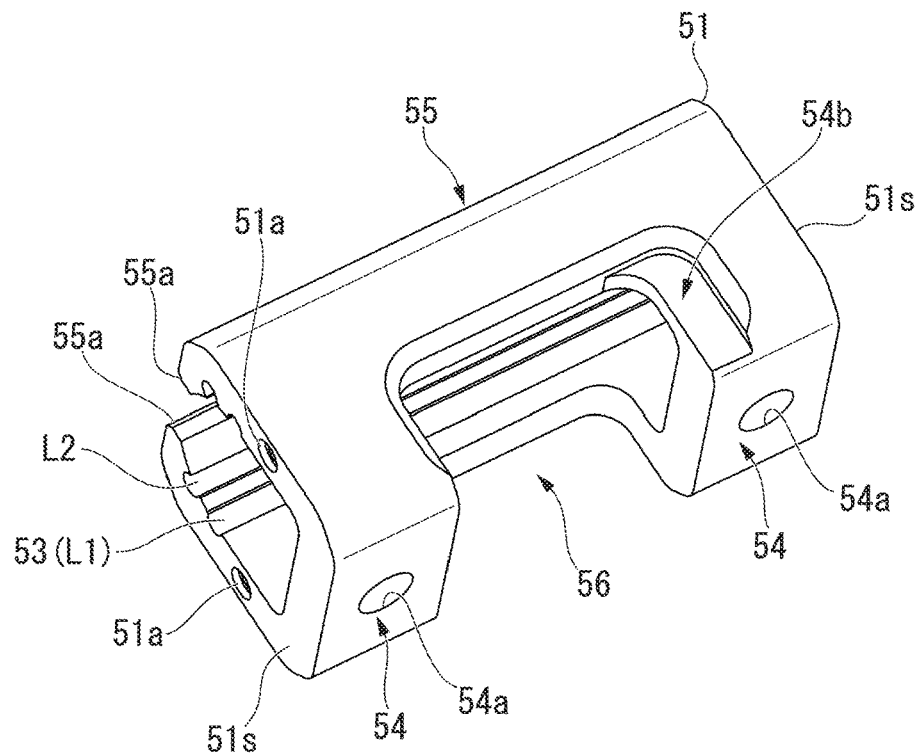
FIG. 8 is a perspective view showing a block main body according to the embodiment of the present invention.
Figure 9A:
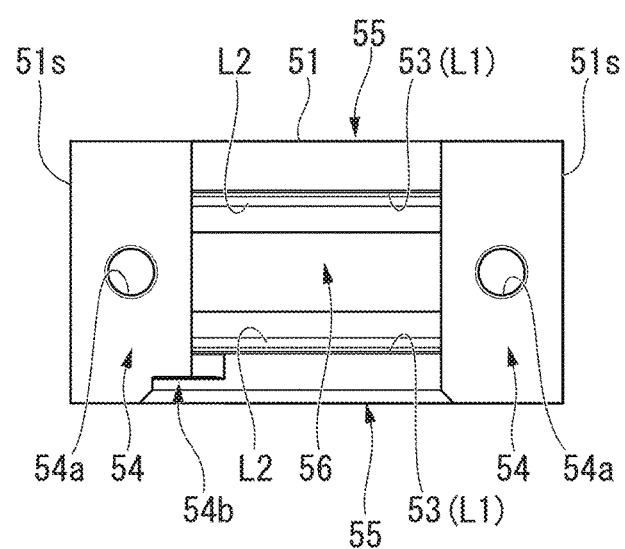
FIG. 9A is a front view of the block main body according to the embodiment of the present invention.
Figure 9B:
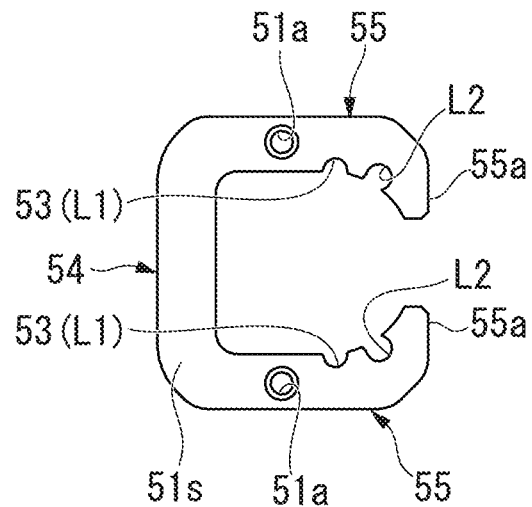
FIG. 9B is a side view of the block main body according to the embodiment of the present invention.
Figure 9C:
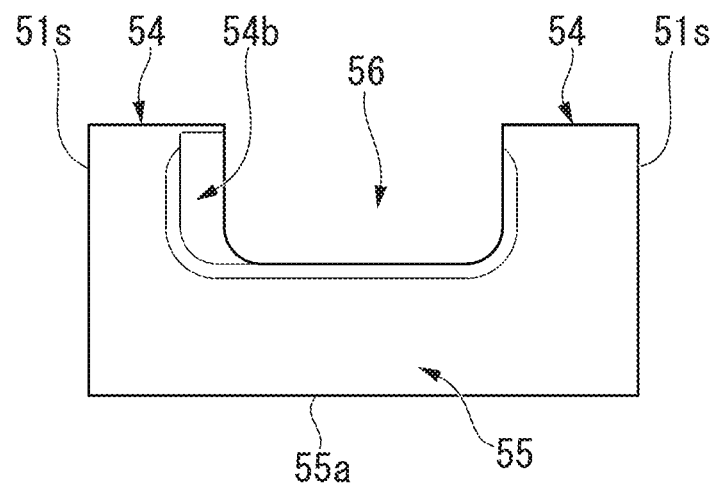
FIG. 9C is a bottom view of the block main body according to the embodiment of the present invention.
Figure 10A:
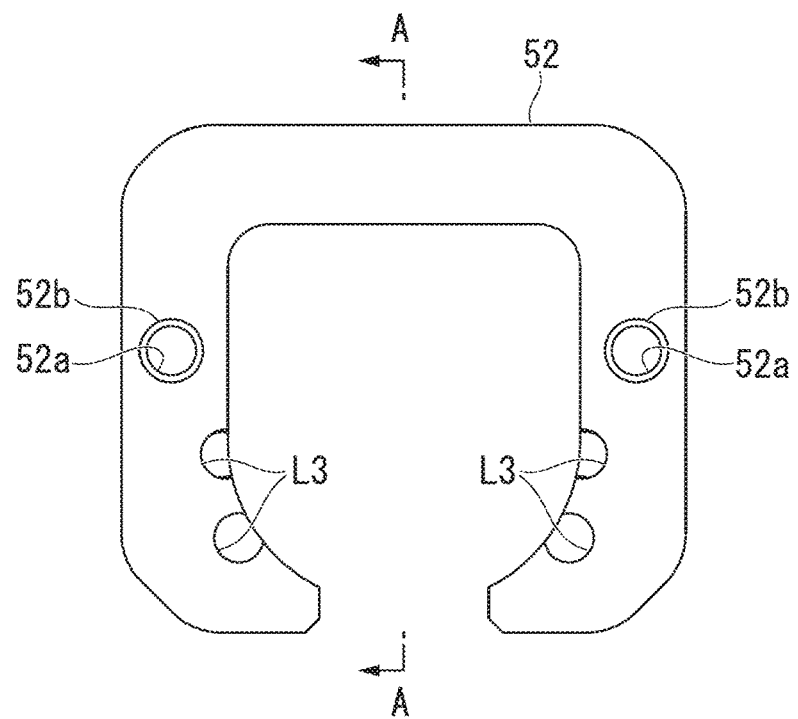
FIG. 10A is a back view of an end plate according to the embodiment of the present invention.
Figure 10B:
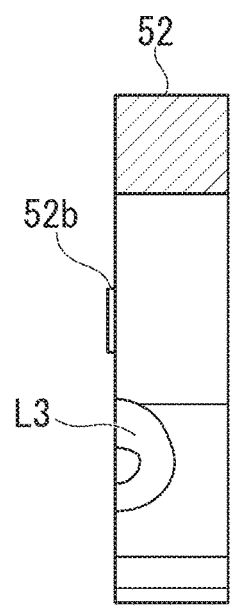
FIG. 10B is an A-A cross-sectional view of the end plate according to the embodiment of the present invention.
Figure 11A:
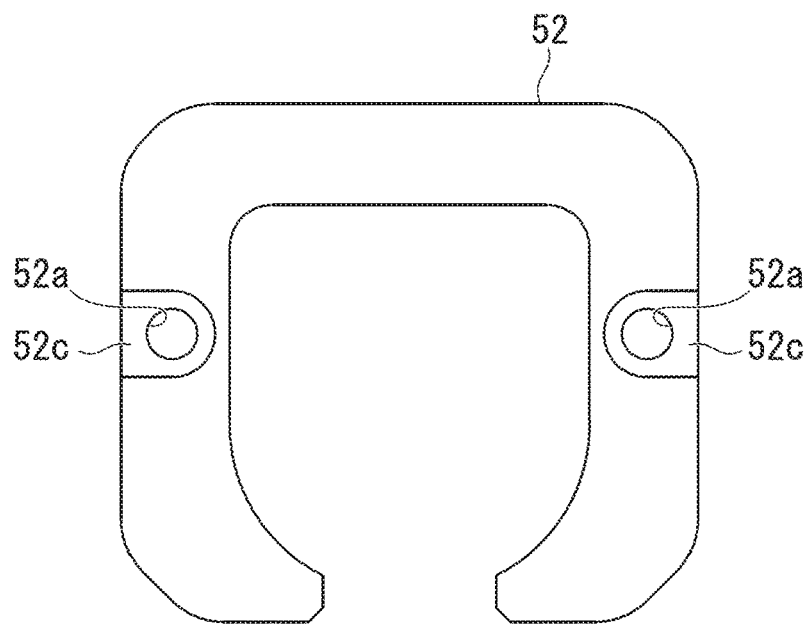
FIG. 11A is a front view of the end plate according to the embodiment of the present invention.
Figure 11B:
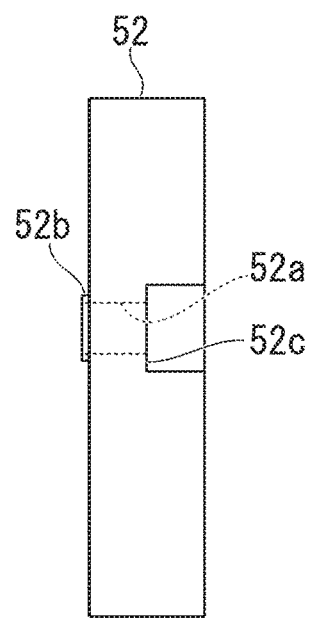
FIG. 11B is a side view of the end plate according to the embodiment of the present invention.

FIG. 7A is a front view showing an engagement state between the support block 50 and the rack bar 30 according to the embodiment of the present invention. FIG. 7B is a bottom view showing the engagement state between the support block 50 and the rack bar 30 according to the embodiment of the present invention. FIG. 8 is a perspective view showing the block main body 51 according to the embodiment of the present invention. FIG. 9A is a front view of the block main body 51 according to the embodiment of the present invention. FIG. 9B is a side view of the block main body 51 according to the embodiment of the present invention. FIG. 9C is a bottom view of the block main body 51 according to the embodiment of the present invention. FIG. 10A is a back view of the end plate 52 according to the embodiment of the present invention. FIG. 10B is an A-A cross-sectional view of the end plate 52 according to the embodiment of the present invention. FIG. 11A is a front view of the end plate 52 according to the embodiment of the present invention. FIG. 11B is a side view of the end plate 52 according to the embodiment of the present invention.

As shown in FIG. 8, a loaded rolling element rolling surface 53 opposed to the rolling element rolling surface 33 and which forms a loaded rolling element rolling path L1 and a rolling element return path L2 provided in parallel with the loaded rolling element rolling path L1 are formed on the block main body 51. As shown in FIG. 10A, a direction change path L3 that connects the loaded rolling element rolling path L1 and the rolling element return path L2 is formed on the end plate 52.

The loaded rolling element rolling path L1 and the rolling element return path L2 are straight line parts that extend in parallel with each other.

The direction change path L3 is a semi-arc curved line part that connects an end part of the loaded rolling element rolling path L1 and an end part of the rolling element return path L2. In this way, a boundless cyclic path of a ball in which the loaded rolling element rolling path L1 and the rolling element return path L2 are connected by the direction change path L3 is formed in an endless elongated annular shape or an endless ellipsoidal annular shape. In the present embodiment, two boundless cyclic paths are formed such that one of the paths is opposed to each of the side surfaces 30s3 of the rack bar 30. As shown in FIG. 9B, two loaded rolling element rolling paths L1 and two rolling element return paths L2 are provided on the block main body 51. As shown in FIG. 10A, two direction change paths L3 are provided on the end plate 52.

As shown in FIG. 8 and FIG. 9B, a screw hole 51a is formed on the end surface 51s of the block main body 51. The screw hole 51a is a hole by which the end plate 52 is attached to the end surface 51s. As shown in FIG. 10A, a hole part 52a that is opposed to the screw hole 51a is formed on the end plate 52. A bolt 73 (refer to FIG. 7B) is inserted in the hole part 52a. The bolt 73 that is inserted through the hole part 52a is screwed to the screw hole 51a, and thereby, the end plate 52 is attached to the block main body 51.

As shown in FIG. 11B, an engagement protrusion 52b is formed on the end plate 52. The engagement protrusion 52b is engaged with an edge of the screw hole 51a of the block main body 51, and the end plate 52 is positioned with respect to the block main body 51. The hole part 52a formed on the end plate 52 penetrates through the engagement protrusion 52b. As shown in FIG. 11A, a seat 52c of the bolt 73 is formed on the end plate 52. The seat 52c is formed in a depth such that a head part of the bolt 73 does not protrude from a surface of the end plate 52.

As shown in FIG. 6, the support block 50 is fixed to the main body part 41 of the housing 40. The block accommodation part 43 of the main body part 41 has a wall surface having a substantially rectangular shape in side view. The support block 50 is fixed to an opposed surface 41s1 that is opposed to the rack gear 32 of the wall surface. The support block 50 is in contact with the opposed surface 41s1. On the other hand, the support block 50 is formed in a non-contact manner with a non-opposed surface 41s2, which is not opposed to the rack gear 32, of the housing 40. A support pin 72 supports the support block 50 from below. The support pin 72 may be removed after the support block 50 is fixed by the bolt 70.

As shown in FIG. 5, the support block 50 has a plurality of attachment parts 54 provided on the opposed surface 41s1 of the housing 40. A screw hole 54a is formed on each of the plurality of attachment parts 54. The screw hole 54a is opposed to the hole part 44 formed to penetrate from the outside to the inside of the housing 40 vertically with respect to the opposed surface 41s1. The bolt 70 is screwed to the screw hole 54a. The bolt 70 that is inserted through the hole part 44 is screwed to the screw hole 54a, and thereby, the support block 50 is fixed to the housing 40.

As shown in FIG. 7A and FIG. 7B, an opening part 56 is formed between the plurality of attachment parts 54. As shown in FIG. 5, the pinion gear 22 is arranged between the plurality of attachment parts 54. The pinion gear 22 has a configuration in which the pinion gear 22 is engaged with the rack gear 32 via the opening part 56. The pinion gear 22 is engaged with the rack bar 30 to be slanted at a predetermined angle with respect to the rack bar 30 in front view shown in FIG. 5. The bearing 42a that supports the pinion shaft 20 is also slanted in accordance with the pinion shaft 20.

A notch part 54b is formed on the attachment part 54 (attachment part 54 on the left side in FIG. 5) that is close to the bearing 42a which supports a lower end part of the pinion shaft 20. The notch part 54b is a part that avoids interference with the slanted bearing 42a (refer to FIG. 8). The pinion gear 22 is engaged with the rack bar 30 to be slanted with respect to the rack bar 30 also in side view shown in FIG. 6. The rack gear 32 is slanted with respect to the front surface 30s1 of the rack bar 30. On the other hand, the rack gear 32 is engaged parallel with the pinion gear 22. The plurality of attachment parts 54 are formed in an arch shape (saddle shape) that straddles the rack gear 32 which is diagonally arranged in side view.

As shown in FIG. 6, the support block 50 has a holding part 55 that holds a surface on which the rack gear 32 of the rack bar 30 is not formed. The holding part 55 of the present embodiment is formed so as to hold a surface other than the front surface 30s1 of the rack bar 30, that is, the side surface 30s3 (holding surface) and a back surface 30s2 (holding surface). The holding part 55 is formed integrally with the plurality of attachment parts 54. As shown in FIG. 7A, the holding part 55 connects the plurality of attachment parts 54. The holding part 55 has a configuration to hold the side surface 30s3 of the rack bar 30 via the ball that rolls on the boundless cyclic path.

As shown in FIG. 6, the holding part 55 has a pair of latch parts 55a latched on the back surface 30s2 of the rack bar 30. The pair of latch parts 55a are close to each other at the back surface 30s2 side of the rack bar 30. The separation dimension between the latch parts 55a is smaller than the width (dimension from a first side surface 30s3 to a second side surface 30s3) of the rack bar 30. In this way, the holding part 55 has a configuration in which the back surface 30s2 of the rack bar 30 is held by the pair of latch parts 55a arranged around to the the back surface 30s2 side of the rack bar 30.

Next, an operation of the rack and pinion apparatus 10 having the above configuration is described with reference to FIG. 12A and FIG. 12B.

Figure 12A:
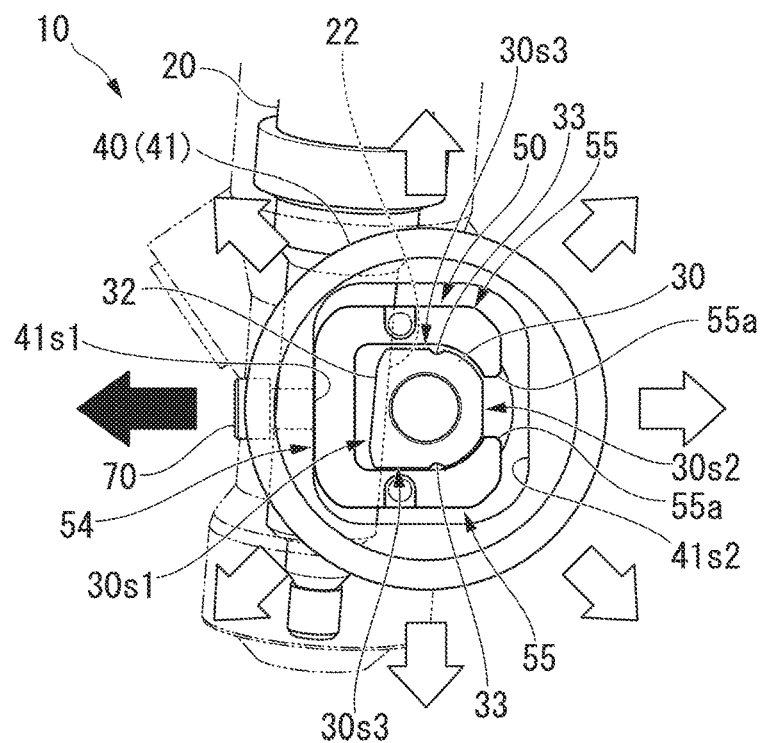
FIG. 12A is a schematic view for describing an operation of the rack and pinion apparatus according to the embodiment of the present invention.
Figure 12B:
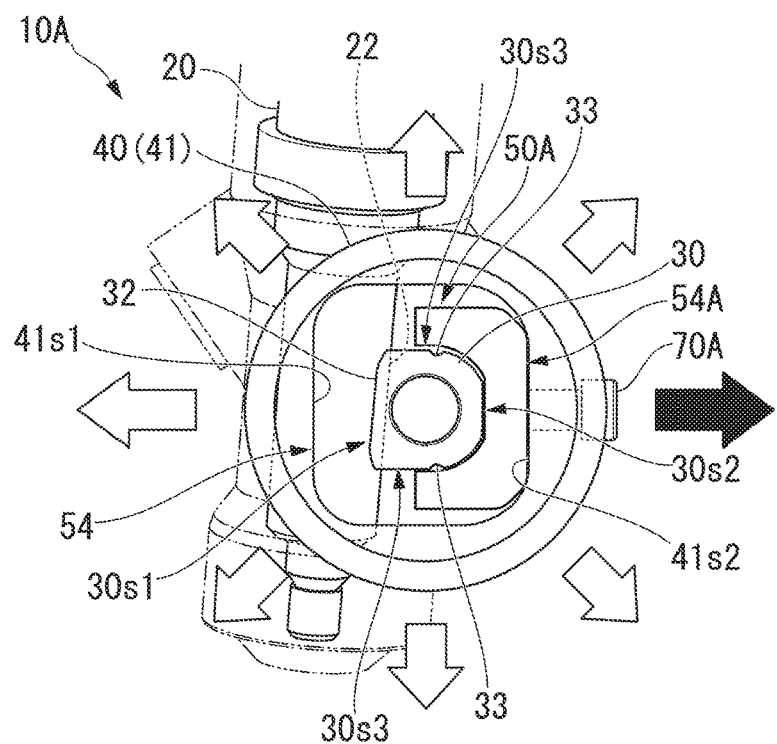
FIG. 12B is a schematic view for describing the operation of the rack and pinion apparatus according to the embodiment of the present invention.

FIG. 12A and FIG. 12B are schematic views for describing an operation of the rack and pinion apparatus 10 according to the embodiment of the present invention. FIG. 12A shows a side view of the rack and pinion apparatus 10 of the present embodiment. FIG. 12B shows a side view of a rack and pinion apparatus 10A of a comparison example.

As shown in FIG. 12B, the rack and pinion apparatus 10A of the comparison example has a support block 50A that is fixed to the non-opposed surface 41s2, which is not opposed to the rack gear 32, of the housing 40. The support block 50A has a configuration in which the rack bar 30 is held from the back surface 30s2 side of the rack bar 30. The rack and pinion apparatus 10A has a configuration in which the preload amount between the rack gear 32 and the pinion gear 22 is adjusted by adjusting a screwed amount of a bolt 70A with respect to the support block 50A.

The housing 40 of the rack and pinion apparatus 10A having the above configuration has a tubular shape that surrounds the rack bar 30. When receiving engine heat, exhaust pipe heat, external ambient heat, or the like, the housing 40 of the rack and pinion apparatus 10A is thermally expanded in the radial direction as represented by an arrow shown in FIG. 12B. The pinion shaft 20 is inserted in the opposed surface 41s1, which is opposed to the rack gear 32, of the housing 40 such that the pinion gear 22 is engaged with the rack gear 32. The pinion shaft 20 is fixed via a bearing (not shown) outside the housing 40 and is not displaced by the effect of thermal expansion of the housing 40.

On the other hand, the support block 50A is fixed to the non-opposed surface 41s2, which is not opposed to the rack gear 32, of the housing 40. Therefore, the support block 50A is displaced to the right side (represented by a black arrow) of FIG. 12B due to thermal expansion of the housing 40. Then, the support block 50 is displaced so as to be separated from the fixed pinion shaft 20 due to thermal expansion of the housing 40. When such displacement occurs, the position of the rack gear 32 is separated from the position of the pinion gear 22, and a preload amount is reduced. The reduction of the preload amount between the rack gear 32 and the pinion gear 22 causes backlash and becomes a reason for causing abnormal noise between gears or a dead zone at the time of steering.

On the other hand, as shown in FIG. 12A, the rack and pinion apparatus 10 of the present embodiment has the support block 50 that is fixed to the opposed surface 41s1, which is opposed to the rack gear 32, of the housing 40. According to this configuration, the support block 50 is displaced to the left side (represented by a black arrow) of FIG. 12A due to thermal expansion of the housing 40. That is, as described above, the pinion shaft 20 is not displaced by the effect of thermal expansion of the housing 40. Therefore, the support block 50 that is fixed to the opposed surface 41s1 of the housing 40 is not displaced so as to be separated from the pinion shaft 20 like the support block 50A that is fixed to the non-opposed surface 41s2 of the housing 40 but is displaced so as to rather approach to the pinion shaft 20. The support block 50 supports the rack bar 30, and the rack bar 30 is not separated from the pinion shaft 20. Therefore, it is possible to prevent reduction of the preload amount between the rack gear 32 and the pinion gear 22.

Further, in the present embodiment, as shown in FIG. 5, the support block 50 has the plurality of attachment parts 54 fixed to the opposed surface 41s1 of the housing 40, and the pinion gear 22 is arranged between the plurality of attachment parts 54. According to the configuration, since the plurality of attachment parts 54 are arranged on both sides of the pinion gear 22, the preload can be easily applied uniformly on the right and left sides by tightening the bolt 70, and it is possible to prevent the deviation of the preload between the rack gear 32 and the pinion gear 22. According to this configuration, the position of the pinion gear 22 is overlapped with the position of the support block 50. Therefore, even when the support block 50 is displaced due to the effect of thermal expansion of the housing 40, as shown in FIG. 12A, the support block 50 becomes a state in which the support block 50 is pushed to the pinion gear 22, and therefore, it is possible to prevent reduction of the preload amount between the rack gear 32 and the pinion gear 22.

Further, in the present embodiment, the support block 50 has the holding part 55 that holds a surface on which the rack gear 32 of the rack bar 30 is not formed, and the holding part 55 is formed integrally with the plurality of attachment parts 54. According to the configuration, the side surface 30s3, on which the rack gear 32 is not formed, of the rack bar 30 is held by the holding part 55, and therefore, it is possible to prevent the movement (displacement) in the width direction (vertical direction in FIG. 6) of the rack bar 30. Since the holding part 55 has the pair of latch parts 55a latched on the back surface 30s2 of the rack bar 30, and the back surface 30s2 of the rack bar 30 is held by the holding part 55, it is possible to prevent the movement (displacement) in a direction (rightward direction in FIG. 6) in which the rack bar 30 is separated from the pinion gear 22. The holding part 55 is formed integrally with the plurality of attachment parts 54, and therefore, it is possible to cause the preload by tightening the plurality of attachment parts 54 work on the rack bar 30 while preventing the movement (displacement) of the rack bar 30 in a direction in which the preload amount is reduced.

Further, in the present embodiment, the rack bar 30 has the rolling element rolling surface 33 in the longitudinal direction, the support block 50 has the loaded rolling element rolling surface 53 opposed to the rolling element rolling surface 33 and which forms the loaded rolling element rolling path L1, the rolling element return path L2 that is provided in parallel with the loaded rolling element rolling path L1, and the direction change path L3 that connects the loaded rolling element rolling path L1 and the rolling element return path L2, and the plurality of balls that circulate the boundless cyclic path formed of the loaded rolling element rolling path L1, the rolling element return path L2, and the direction change path L3 are provided. According to the configuration, since the plurality of balls are interposed between the rack bar 30 and the support block 50, it is possible to reduce the resistance when moving the rack bar 30 in the longitudinal direction with respect to the support block 50, and it is possible to realize a smooth steering operation.

As described above, according to the present embodiment described above, by adopting a configuration that includes: the rack bar 30 in which the rack gear 32 is formed; the housing 40 that surrounds the rack bar 30; the pinion shaft 20 including the pinion gear 22 that engages with the rack gear 32 and that is inserted inside the housing 40; and the support part 50 that is provided on the opposed surface 41s1, which is opposed to the rack gear 32, of the housing 40 and that supports the rack bar 30 movably in the longitudinal direction of the rack bar 30, it is possible to obtain the rack and pinion apparatus 10 and the steering apparatus 1 capable of preventing reduction of the preload amount between the rack gear 32 and the pinion gear 22 due to thermal expansion of the housing 40.

Although a preferred embodiment of the present invention is described with reference to the drawings, the present invention is not limited to the above embodiment. A variety of shapes and combination of the configuration members shown in the embodiment described above and the like are examples, and various changes can be made based on design requests and the like without departing from the scope of the present invention.

For example, a configuration in which a plurality of balls are interposed between the rack bar 30 and the support block 50 is described in the above embodiment; however, the configuration is not limited thereto. A roller may be used instead of the ball.

Further, for example, the rolling element such as the ball or the roller may not be used, and the rack bar and the support block may slide (be slidably supported) with respect to each other.

Further, the above embodiment is described using an example in which the rack bar 30 is formed in a substantially square pillar shape; however, the embodiment is not limited thereto. For example, the rack bar 30 may have a column shape, a cylindrical shape, a polygonal column shape, and the like. A radial bearing (journal bearing) that allows the movement in the right-to-left direction of the rack bar 30 may be used instead of the support block 50.

A case in which the rack bar 30 is supported by one support block 50 is described; however, the embodiment is not limited thereto. A plurality of support blocks 50 may be arranged.

Further, the rack bar 30 may be supported by using a plurality of bearings and the like instead of the support block 50.

Further, the above embodiment is described using an example in which the side surface 30s3 and the back surface 30s2 of the rack bar 30 are held by the support block 50; however, the embodiment is not limited thereto. The support block 50 may hold only the side surface 30s3 of the rack bar 30. The support block 50 may hold only the back surface 30s2.

Further, the above embodiment is described using an example in which a pair of attachment parts 54 are provided; however, the embodiment is not limited thereto. A single attachment part 54 may be provided. Alternatively, two or more attachment parts 54 may be provided.

Further, the above embodiment is described using an example in which the hole part 44 is a circular hole; however, the embodiment is not limited thereto. For example, the hole part 44 may be an elongated hole that extends in a direction orthogonal to the rack bar 30 or a circular hole formed to have a diameter that is larger than a diameter of the bolt 70. According to the configuration, it is possible to move the fixation position of the support block 50 in the vertical direction in FIG. 6 and to adjunct the preload amount between the rack gear 32 and the pinion gear 22. That is, the rack gear 32 is diagonally formed. Therefore, when moving the fixation position of the support block 50 in the upward direction in FIG. 6, it is possible to increase the preload amount between the rack gear 32 and the pinion gear 22. On the other hand, when moving the fixation position of the support block 50 in the downward direction in FIG. 6, it is possible to decrease the preload amount between the rack gear 32 and the pinion gear 22.

The above embodiment is described using an example in which the rack and pinion apparatus 10 is used for the steering apparatus 1 of a vehicle A; however, the embodiment is not limited thereto. For example, the rack and pinion apparatus 10 can be used for a steering apparatus of a ship, an airplane, and the like.

DESCRIPTION OF THE REFERENCE SYMBOLS 1 steering apparatus
3 steering shaft
5 link member
10 rack and pinion apparatus (rotation-linear motion conversion apparatus)
20 pinion shaft
22 pinion gear
30 rack bar
30s2 back surface (holding surface)
30s3 side surface (holding surface)
32 rack gear
33 rolling element rolling surface
40 housing
41s1 opposed surface
41s2 non-opposed surface
50 support block (support part)
53 loaded rolling element rolling surface
54 attachment part
55 holding part
L1 loaded rolling element rolling path
L2 rolling element return path
L3 direction change path
T tire

The invention claimed is:

1. A rotation-linear motion conversion apparatus, comprising:
    a rack bar in which a rack gear is formed;
    a housing that surrounds the rack bar;
    a pinion shaft comprising a pinion gear that engages with the rack gear and that is inserted inside the housing; and
    a support part that is provided on an opposed surface, which is opposed to the rack gear, of the housing and that supports the rack bar movably in a longitudinal direction of the rack bar, wherein
    the support part is in non-contact with a non-opposed surface, which is not opposed to the rack gear, of the housing.

2. The rotation-linear motion conversion apparatus according to claim 1, wherein
    the support part comprises:
    a holding part that holds a holding surface on which the rack gear of the rack bar is not formed; and
    an attachment part that is provided on the opposed surface of the housing.

3. The rotation-linear motion conversion apparatus according to claim 2, wherein
    the support part comprises a plurality of the attachment parts, and
    the pinion gear is arranged between the plurality of the attachment parts.

4. The rotation-linear motion conversion apparatus according to claim 3, wherein
    the holding part is formed integrally with the plurality of the attachment parts.

5. The rotation-linear motion conversion apparatus according to claim 1, wherein
    the rack bar comprises a rolling element rolling surface in the longitudinal direction,
    the support part comprises: a loaded rolling element rolling surface opposed to the rolling element rolling surface and which forms a loaded rolling element rolling path; a rolling element return path that is provided in parallel with the loaded rolling element rolling path; and a direction change path that connects the loaded rolling element rolling path and the rolling element return path, and
    the rotation-linear motion conversion apparatus comprises a plurality of rolling elements that circulate a boundless cyclic path formed of the loaded rolling element rolling path, the rolling element return path, and the direction change path.

6. The rotation-linear motion conversion apparatus according to claim 2, wherein
the rack bar comprises a rolling element rolling surface in the longitudinal direction,
the support part comprises: a loaded rolling element rolling surface opposed to the rolling element rolling surface and which forms a loaded rolling element rolling path; a rolling element return path that is provided in parallel with the loaded rolling element rolling path; and a direction change path that connects the loaded rolling element rolling path and the rolling element return path, and
the rotation-linear motion conversion apparatus comprises a plurality of rolling elements that circulate a boundless cyclic path formed of the loaded rolling element rolling path, the rolling element return path, and the direction change path.

7. The rotation-linear motion conversion apparatus according to claim 3, wherein
the rack bar comprises a rolling element rolling surface in the longitudinal direction,
the support part comprises: a loaded rolling element rolling surface opposed to the rolling element rolling surface and which forms a loaded rolling element rolling path; a rolling element return path that is provided in parallel with the loaded rolling element rolling path; and a direction change path that connects the loaded rolling element rolling path and the rolling element return path, and
the rotation-linear motion conversion apparatus comprises a plurality of rolling elements that circulate a boundless cyclic path formed of the loaded rolling element rolling path, the rolling element return path, and the direction change path.

8. The rotation-linear motion conversion apparatus according to claim 4, wherein
the rack bar comprises a rolling element rolling surface in the longitudinal direction,
the support part comprises: a loaded rolling element rolling surface opposed to the rolling element rolling surface and which forms a loaded rolling element rolling path; a rolling element return path that is provided in parallel with the loaded rolling element rolling path; and a direction change path that connects the loaded rolling element rolling path and the rolling element return path, and
the rotation-linear motion conversion apparatus comprises a plurality of rolling elements that circulate a boundless cyclic path formed of the loaded rolling element rolling path, the rolling element return path, and the direction change path.

9. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 1 as the rotation-linear motion conversion apparatus.

10. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 2 as the rotation-linear motion conversion apparatus.

11. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 3 as the rotation-linear motion conversion apparatus.

12. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 4 as the rotation-linear motion conversion apparatus.

13. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 5 as the rotation-linear motion conversion apparatus.

14. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 6 as the rotation-linear motion conversion apparatus.

15. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 8 as the rotation-linear motion conversion apparatus.

16. A steering apparatus, comprising:
a steering shaft that is connected to a steering wheel;
a link member that is connected to a wheel; and
a rotation-linear motion conversion apparatus that converts a rotation of the steering shaft into a linear motion and that linearly moves the link member, wherein
the steering apparatus comprises a rotation-linear motion conversion apparatus according to claim 9 as the rotation-linear motion conversion apparatus.

\* \* \* \* \*